(12) United States Patent
Sargent

(10) Patent No.: US 6,874,010 B1
(45) Date of Patent: Mar. 29, 2005

(54) BASE SERVICE ARCHITECTURES FOR NETCENTRIC COMPUTING SYSTEMS

(75) Inventor: Scott R. Sargent, Kenilworth, IL (US)

(73) Assignee: Accenture LLP, Palo Alto, CA (US)

(*) Notice: Subject to any disclaimer, the term of this patent is extended or adjusted under 35 U.S.C. 154(b) by 712 days.

(21) Appl. No.: 09/677,074

(22) Filed: Sep. 29, 2000

Related U.S. Application Data

(60) Provisional application No. 60/156,962, filed on Oct. 1, 1999.

(51) Int. Cl.⁷ .............................................. G06F 15/16
(52) U.S. Cl. ....................... 709/203; 709/223; 709/226; 709/227; 718/101
(58) Field of Search ............................... 709/203, 223, 709/101

(56) References Cited

U.S. PATENT DOCUMENTS

| | | | |
|---|---|---|---|
| 4,809,170 A | 2/1989 | Leblang | 364/200 |
| 5,495,610 A | 2/1996 | Shing et al. | 395/600 |
| 5,535,388 A | 7/1996 | Takeda | 395/650 |
| 5,590,270 A | 12/1996 | Tsukuda | 395/701 |

(Continued)

FOREIGN PATENT DOCUMENTS

| | | | | |
|---|---|---|---|---|
| EP | 0520923 A2 | 12/1992 | ........... | G06F/15/21 |
| EP | 0697655 A2 | 2/1996 | ............. | G06F/9/46 |
| EP | 0697691 A2 | 2/1996 | ............. | G09G/5/14 |
| EP | 0769739 A2 | 4/1997 | ............. | G06F/9/44 |

(Continued)

OTHER PUBLICATIONS

Billy B.L. Lim, "Teaching web development technologies in CS/IS curricula," ACM, copyright 1998, pp. 107–111.

Litoiu et al., "A performance engineering tool and method for distributed applications," ACM, pp. 1–14.

Zoller et al., "A toolkit for an automatic, data dictionary based connection of databases to the WWW," ACM, copyright 1998, pp. 706–718.

(Continued)

*Primary Examiner*—Hosain Alam
*Assistant Examiner*—Michael Y. Won
(74) *Attorney, Agent, or Firm*—Brinks Hofer Gilson & Lione

(57) ABSTRACT

A base services architecture for a netcentric computing system is disclosed. The base services architecture includes at least one web server that is connected with an Internet connection and at least one client. A web server service is located on the web server. During operation, the web server service enables the web server to transfer and publish a plurality of documents in the web browser on the client. A push/pull service is located on the web server for automatically notifying members of a subscriber list of the netcentric computing system when a particular piece of information has been changed or updated. A workflow service is located on the web server that includes role management service, route management services, rule management services and queue management services. A batch processing service is also located on the web server that includes batch driver services, restart/recovery services, batch balancing services and batch report services; and a report service on said web server that includes report driver services, report definition services, report build services and report distribution services.

17 Claims, 6 Drawing Sheets

U.S. PATENT DOCUMENTS

| | | |
|---|---|---|
| 5,602,997 A | 2/1997 | Carpenter et al. .......... 395/349 |
| 5,619,716 A | 4/1997 | Nonaka et al. ............. 395/800 |
| 5,710,915 A | 1/1998 | McElhiney ................. 395/603 |
| 5,737,533 A | 4/1998 | deHond ................ 395/200.49 |
| 5,742,829 A | 4/1998 | Davis et al. ............... 395/712 |
| 5,745,753 A | 4/1998 | Mosher, Jr. ................ 395/618 |
| 5,758,150 A | 5/1998 | Bell et al. .................. 395/610 |
| 5,761,071 A | 6/1998 | Bernstein et al. ...... 364/479.07 |
| 5,781,732 A | 7/1998 | Adams ................. 395/200.35 |
| 5,799,297 A | 8/1998 | Goodridge et al. ............ 707/1 |
| 5,805,785 A | 9/1998 | Dias et al. ............ 395/182.02 |
| 5,835,090 A | 11/1998 | Clark et al. ................. 345/339 |
| 5,859,969 A | 1/1999 | Oki et al. ............... 395/200.3 |
| 5,860,012 A | 1/1999 | Luu .......................... 395/712 |
| 5,877,759 A | 3/1999 | Bauer ........................ 345/339 |
| 5,892,905 A | 4/1999 | Brandt et al. .......... 395/187.01 |
| 5,905,868 A | 5/1999 | Baghai et al. ......... 395/200.54 |
| 5,911,071 A | 6/1999 | Jordan ........................ 395/701 |
| 5,924,096 A | 7/1999 | Draper et al. ................. 707/10 |
| 5,933,582 A | 8/1999 | Yamada ...................... 395/114 |
| 5,956,479 A | 9/1999 | McInerney et al. .... 395/183.14 |
| 6,006,171 A | 12/1999 | Vines et al. ................ 702/184 |
| 6,012,071 A | 1/2000 | Krishna et al. ............. 707/522 |
| 6,023,698 A | 2/2000 | Lavey, Jr. et al. ............ 707/10 |
| 6,029,192 A | 2/2000 | Hill et al. ................... 709/206 |
| 6,038,560 A | 3/2000 | Wical ............................ 707/5 |
| 6,061,695 A | 5/2000 | Slivka et al. ............... 707/513 |
| 6,067,577 A | 5/2000 | Beard ......................... 709/305 |
| 6,081,518 A | 6/2000 | Bowman-Amuah |
| 6,112,304 A | 8/2000 | Clawson .................... 713/156 |
| 6,144,975 A | 11/2000 | Harris, Jr. et al. .......... 707/901 |
| 6,147,975 A | 11/2000 | Bowman-Amuah |
| 6,185,573 B1 | 2/2001 | Angelucci et al. .......... 707/104 |
| 6,195,697 B1 | 2/2001 | Bowman-Amuah |
| 6,256,773 B1 | 7/2001 | Bowman-Amuah ............ 717/1 |
| 6,321,263 B1 | 11/2001 | Luzzi et al. ................ 709/224 |
| 6,324,647 B1 | 11/2001 | Bowman-Amuah |
| 6,332,163 B1 | 12/2001 | Bowman-Amuah |
| 6,339,832 B1 | 1/2002 | Bowman-Amuah |
| 6,345,239 B1 | 2/2002 | Bowman-Amuah |
| 6,366,912 B1 | 4/2002 | Wallent et al. .................. 707/9 |
| 6,370,573 B1 | 4/2002 | Bowman-Amuah |
| 6,385,655 B1 | 5/2002 | Smith et al. ................ 709/232 |
| 6,401,097 B1 | 6/2002 | McCotter et al. ........... 707/102 |
| 6,405,364 B1 | 6/2002 | Bowman-Amuah ......... 717/101 |
| 6,418,430 B1 | 7/2002 | DeFazio et al. ................ 707/3 |
| 6,426,948 B1 | 7/2002 | Bowman-Amuah |
| 6,427,132 B1 | 7/2002 | Bowman-Amuah |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,547 B1 | 8/2002 | Bowman-Amuah |
| 6,442,748 B1 | 8/2002 | Bowman-Amuah |
| 6,449,588 B1 | 9/2002 | Bowman-Amuah |
| 6,457,066 B1 | 9/2002 | Mein et al. ................. 709/330 |
| 6,477,580 B1 | 11/2002 | Bowman-Amuah |
| 6,477,665 B1 | 11/2002 | Bowman-Amuah |
| 6,496,850 B1 | 12/2002 | Bowman-Amuah |
| 6,502,213 B1 | 12/2002 | Bowman-Amuah |
| 6,523,027 B1 | 2/2003 | Underwood .................... 707/4 |
| 6,529,909 B1 | 3/2003 | Bowman-Amuah |
| 6,529,948 B1 | 3/2003 | Bowman-Amuah ......... 709/217 |
| 6,539,396 B1 | 3/2003 | Bowman-Amuah |
| 6,542,593 B1 | 4/2003 | Bowman-Amuah |
| 6,549,949 B1 | 4/2003 | Bowman-Amuah |
| 6,550,057 B1 | 4/2003 | Bowman-Amuah |
| 6,556,659 B1 | 4/2003 | Bowman-Amuah |
| 6,571,282 B1 | 5/2003 | Bowman-Amuah |
| 6,578,068 B1 | 6/2003 | Bowman-Amuah |
| 6,584,466 B1 | 6/2003 | Serbinis et al. ............... 707/10 |
| 6,598,046 B1 | 7/2003 | Goldberg ........................ 707/5 |
| 6,601,192 B1 | 7/2003 | Bowman-Amuah |
| 6,601,234 B1 | 7/2003 | Bowman-Amuah |
| 6,606,660 B1 | 8/2003 | Bowman-Amuah |
| 6,611,867 B1 | 8/2003 | Bowman-Amuah |
| 6,615,199 B1 | 9/2003 | Bowman-Amuah |
| 6,615,253 B1 | 9/2003 | Bowman-Amuah |
| 6,615,258 B1 | 9/2003 | Barry ......................... 709/223 |
| 6,636,242 B2 | 10/2003 | Bowman-Amuah |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah ......... 709/228 |
| 6,662,357 B1 | 12/2003 | Bowman-Amuah ......... 717/120 |
| 6,697,824 B1 | 2/2004 | Bowman-Amuah |
| 6,704,303 B1 | 3/2004 | Bowman-Amuah |
| 6,707,812 B1 | 3/2004 | Bowman-Amuah |
| 6,715,145 B1 | 3/2004 | Bowman-Amuah |
| 6,721,713 B1 | 4/2004 | Guheen et al. ................ 705/1 |
| 6,742,015 B1 | 5/2004 | Bowman-Amuah |
| 2001/0052108 A1 | 12/2001 | Bowman Amuah |
| 2002/0120553 A1 | 8/2002 | Bowman Amuah |
| 2002/0133328 A1 | 9/2002 | Bowman Amuah |
| 2003/0058277 A1 | 3/2003 | Bowman Amuah |
| 2004/0030705 A1 | 2/2004 | Bowman Amuah |
| 2004/0030749 A1 | 2/2004 | Bowman Amuah |

FOREIGN PATENT DOCUMENTS

| | | | |
|---|---|---|---|
| EP | 0810520 A1 | 12/1997 | ............ G06F/9/44 |
| EP | 0829808 A2 | 3/1998 | .......... G06F/13/38 |
| EP | 0915422 A1 | 5/1999 | .......... G06F/11/22 |
| GB | 2315891 A | 2/1998 | .......... G06F/17/30 |
| WO | WO 92/20022 | 11/1992 | ............ G06F/1/00 |
| WO | WO 97/12311 | 4/1997 | |
| WO | WO 98/52121 | 11/1998 | .......... G06F/11/32 |
| WO | WO 98/53396 | 11/1998 | ............ G06F/9/44 |
| WO | WO 98/54660 | 12/1998 | .......... G06F/17/30 |
| WO | WO 98/57260 | 12/1998 | ............ G06F/9/44 |
| WO | WO 99/38079 | 7/1999 | .......... G06F/13/00 |

OTHER PUBLICATIONS

McDowell et al., "Unloading Java classes that contain static fields," ACM, v. 33(1), Oct. 15, 1997, pp. 56–60.

Orfall, R., Harkey, D., "Client/Server Programming with OS/2 2.0 (2nd Ed.)" 1992, Van Nostrand Reinhold New York, U.S., pp. 10–24, 111–137, 149–160, 588–594, XP002164217, ISBN 0–442–01219–5.

Orfall, R., Harkey, D., Edwards, J., "Intergalactic Client/ Server Computing, " Byte, McGraw–Hill, Inc., St. Peterborough, U.S., vol. 20, No. 4, Apr. 1, 1995, pp. 108–110, 114, 11, XP000501823, ISSN: 0360–5280.

Smeets, J., Boyer, S., "Internal and Client Server Patent Information Systems: New Services from Derwent," World Patent Information, GB, Elsevier Sciences Publishing, Barking, vol. 20, No. 2, Jun. 1998, pp. 136–139, XP004165804, ISSN 0172–2190.

Orfall, R., Harkey, D., "Client/Server With Distributed Objects," Byte, McGraw–Hill, Inc., St. Peterborough, U.S., vol. 20, No. 4, Apr. 1, 1995, pp 151–152, 154, 156, XP000501827, ISSN 0360–5280.

Aoyama, M., Hanai, Y., Suzuki, M., "An Integrated Software Maintenance Environment: Bridging Configuration Management and Quality Management," Proceedings of the Conference on Software Maintenance, International Conference on Software Maintenance, Washington, US, IEEE Computer Society Press, Oct. 24, 1988 pp. 40–44.

Borsook, P., "Seeking Security. Mainframe Techniques Define System Security. Soon, they'll be Adapted To Distributed Client/Server Systems." Byte, McGraw–Hill, Inc., St. Peterborough, vol. 18, No. 6, May 1, 1993, pp. 119–122, 124, 12, XP000359327, ISSN 0360–5280.

Tanenbaum, A., "Computer Networks—Third Edition," Prentice–Hall International, London, GB, 1996, pp. 28–39, XP002161723.

Blakeley, J.A., "Universal Data Access with OLE DB," Proceedings of IEEE Compcon, U.S. Los Alamitos, IEEE Computer Society Press, Feb. 23, 1997, pp. 2–7.

IBM Technical Disclosure Bulletin, "Security, License Management and Application Metering Process for Controlling Applications in the DOS Environment," IMB Corp., New York, US, vol. 37, No. 11, pp 195–199, Nov. 1, 1994.

Voth, G.R., Kindel, C., Fujioka, J., "Distributed Application Development for Three–Tier Architectures: Microsoft on Windows DNA," IEEE Internet Computing vol. 2, No. 2, Mar./Apr. 1998, USA.

Lambert, N., "A New Patent Search Tool For The Internet. Q–PAT US." Database, US, Cincinnati, vol. 19, No. 4, Aug. 1, 1996.

Abdel–Mottaleb, M., Hsiang–Lung, W., Dimitrova, N., "Aspects of Multimedia Retrieval," Philips Journal of Research, NL, Elsevier, Amsterdam, vol. 50, No. 1, 1996, pp. 227–251.

Olson, M.A., "DataBlade extensions for INFORMIX–Universal Server," Compcon '97 Proceedings, IEEE, 1997, pp. 143–148.

Chamberlin, D.D., "Evolution of Object–Relational Database Technology in DB2," Compcon '97 Proceedings, IEEE, 1997, pp. 131–135.

Nori, A.K., Kumar, S., "Bringing Objects to the Mainstream," Compcon '97 Proceedings, IEEE, 1997, pp. 136–142.

"Data Joiner: A Multidatabase Server Version 1," White Paper, IBM Data Management Solutions, IBM, USA, second edition (May 1995).

"Effective Systems management for DB2 Universal Database," White Paper, IBM Data Management Solutions, IBM, USA, first edition (Dec. 1996).

Pleas, K., "Ole's Missing Links," BYTE, McGraw–Hill Inc., St. Peterborough, US, vol. 21, No. 4, Apr. 1, 1996, pp. 99–102 X–000586036, ISSN 0360–5280.

Burke, M.G., Choi, J.D., Fink, S., Grove, D., Hind, M., Sarkar, V., Serrano, M.J., Sreedhar, V.C., Srinivasan, H., "The Jalapeno Dynamic Optimizing Compiler for Java," Java '99, San Francisco, CA, US, ACM Jun. 12, 1999, pp. 129–141 XP002134655.

Cramer, T., Friedman, R., Millier, T., Seberger, D., Wilson, R., Wolczko, M.,"Compiling Java Just in Time," IEEE Micro, IEEE Inc., New York, US, vol. 17, No. 3, May 1, 1997, pp. 36–43 XP000656035, ISSN: 0272–1732.

Bank, J.S., "Java Security," Dec. 8, 1995, pp. 1–13, X–002092325.

Koved, L., Nadalin, A.J., Neal, D., Lawson, T., "The Evolution of Java Security," IBM, The Ultimate Resource for Java Developers, 1998, pp. 1–14, XP002144222.

North, K., "Database Programming with OLE and ActiveX," DBMS, US, M&T Publ., Redwood City, CA, US, 11–1996, pp. 1–8.

Joshi, S.M., Veeramani, D., "Book Review. Increasing the Interoperability of CAD Packages. CAD and Office Integration: OLE for Design and Modeling—A New Technology for CA–Software," Computer Aided Design, Elsevier Publishers BV, Barking, GB, vol. 29, No. 12, Dec. 1, 1997, pp. 907.

Schmoll, J. "Wird OLE for Process Controll (OPC) Ein Neuer Industriestandard?", Automatisierungstechnische Praxis, ATP, Oldenbourg Verlag, Munchen, DE, vol. 39, No. 5, May 1, 1997, pp. 11–12, 14–17.

Williams, S., Kindel, C., "The Component Object Model. The Foundation for OLE Services," Dr. Dobb's Special Report. Winter, 1994/95, vol. 19, No. 16, Dec. 21, 1994 pp. 14–22.

Smith, D., Tilley, S.R., Weiderman, N.H., "Transforming Legacy Application into Object–Oriented Appliations Workshop, Will Net–Centric Computing Change the Reengineering Equation?" 1996, pp. 1–4.

Hamilton, M.A., "Java and the shift to Net–centric computer," Sun Microsystems, Computer, paper published Aug. 1996, ISSN: 0018–9162, Aug. 1996, pp. 31–39.

Engestrom, J., Software Agents, Towards Transparent Mediation, A Technology Report for Salama Interactive, Jan. 1999, pp. 1–19.

Morris, K.S. and Flater, D., "Standards–based software testing in a Net–Centric World," pp. 1–8 (cited by Examiner, no date given).

Raje, R. and Chinnasamy, S., "Designing a distributed computing environment for global scale systems: challenges and issues," ACM SIGAPP Applied Computing Review, vol. 7, Issue 1, Spring 1999, pp. 25–30.

Copyright Registration for Netcentric Computing: Computing, Communications and knowledge, Reg. Jan. 9, 1998, p. 1.

Kramer, D., The Java™ Platform: A White Paper, JavaSoft, pp. 1–25, May 1996.

www.empowermentzone.com/javacomp.txt, Sun Microsystems, pp. 1–18, 1996.

Copy of co–pending patent application, U.S. Appl. No. 09/386,917, filed Aug. 31, 1999; 340 pages, Inventor Michael K. Bowman–Amuah.

Copy of co–pending patent application, U.S. Appl. No. 10/647,411, filed Aug. 25, 2003; 22 pages, Inventor Michael K. Bowman–Amuah.

Copy of co–pending patent application, U.S. Appl. No. 09/387,654, filed Aug. 31, 1999; 818 pages, Inventor Michael K. Bowman–Amuah.

BASE SERVICE ARCHITECTURES FOR NETCENTRIC COMPUTING SYSTEMS

This application claims the benefit under 35 U.S.C. §119(e) of U.S. Provisional Application Ser. No. 60/156,962 filed on Oct. 1, 1999.

FIELD OF THE INVENTION

The present invention relates generally to business computing systems, and more particularly, to base service architectures for netcentric computing systems.

BACKGROUND OF THE INVENTION

Computer-based business solutions have existed for various different types of transactions since the mid-to-late 1960s. During this time period, the technology focused on the use of batch technology. In batch processing, the business user would present a file of transactions to the application. The computer system would then run through the transactions, processing each one, essentially without user intervention. The system would provide reporting at some point in the batch processing. Typically, the reports would be batch-printed, which, in turn, would be used by the business user to correct the input transactions that were resubmitted along with the next batch of transactions.

In the 1970s, businesses began a transition to on-line, interactive transactions. At a conceptual level, this processing opened up the file of transactions found in batch transactions and allowed the user to submit them one at a time, receiving either immediate confirmation of the success of the transaction or else feedback on the nature of the transaction error. The conceptually simple change of having the user interact with the computer on a transaction-at-a-time basis caused huge changes in the nature of business computing. More important, users saw huge changes in what they could do on a day-to-day basis. Customers were no longer forced to wait for a batch run to process the particular application. In essence, the computer had an impact on the entire work flow of the business user.

Along with the advent of on-line interactive systems, it was equally significant that the systems provided a means for the business user to communicate with others in the business as the day-to-day business went along. This capability was provided on the backbone of a wide area network (WAN). The WAN was in itself a demanding technology during this time period and, because of these demands, telecommunications groups emerged within organizations, charged with the responsibility to maintain, evolve and manage the network over a period of time.

The theme of the 1980s was database management systems (DBMSs). Organizations used and applied database technology in the 1970s, but in the 1980s, they grew more confident in the application of DBMS technology. Because of the advances in network technology, the focus was now on the sharing of data across organizational and application boundaries. Curiously, database technology did not change the fundamental way in which business processing was done. DBMS made it more convenient to access the data and to ensure that it could be updated while maintaining the integrity of the data.

In the 1990s, technology began to shift toward client/server computing. Client/server computing is a style of computing involving multiple processors, one of which is typically a workstation, and across which a single business transaction is completed. Using the workstation, the transaction entered by the user could now be processed on a keystroke-by-keystroke basis.

Furthermore, there was a change in the communications. With client/server, users could communicate with others in the work group via a local area network (LAN). The LAN permitted workstation-to-workstation communications at speeds of 100 to 1,000 times what was typically available on a WAN. The LAN was a technology that could be grown and evolved in a local office with little need for direct interaction from the telecommunications group.

During the late 1990s, the Internet began to receive widespread use by consumers and businesses. In the business world, the Internet has caused the concept of business users to expand greatly because of the way in which computers are now capable of being interconnected. In addition, the cost of computers has dropped to the point that it is affordable for almost every household to own a computer if so desired. As such, a need to expand the reach of computing both within and outside the enterprise, and that enables the sharing of data and content between individuals and applications has developed.

SUMMARY OF THE INVENTION

The present invention discloses a base services architecture for a netcentric computing system. The base services architecture preferentially includes at least one web server that is connected with an Internet connection and at least one client. In the preferred embodiment the client includes a web browser that is capable of communicating over the Internet connection with the web server. A web server service is located on the web server. The web server service enables the web server to transfer and publish a plurality of documents in the web browser on the client. A push/pull service is also located on the web server for automatically notifying members of a subscriber list on the netcentric computing system when a particular piece of information has been changed or updated.

The preferred base services architecture also includes a workflow service on the web server that includes role management services, route management services, rule management services and queue management services. A batch processing service is also located on the web server that includes batch driver services, restart/recovery services, batch balancing services and batch report services. In addition, a report service is located on the web server that includes report driver services, report definition services, report build services and report distribution services.

In the preferred embodiment of the present invention, the documents that are transferred to the web browser from the web server services are in HTML format. The web server service also enables the web server to transfer and execute a plurality of software applications in a web browser on the client. In addition, the web server services are also capable of processing scripts on the web server in response to requests by the clients. The scripts that can be processed by the web server services may include common gateway interface scripts and active server page scripts. Another aspect that the web server services provide the base services architecture is the ability to cache a plurality of web pages that are generated by the web server in response to requests from the client. The workflow services of the base services architecture control a plurality of business tasks that must be completed to process a business event in the netcentric computing system. The business event can encompass anything from a sale to a service call.

The batch driver services of the batch application services control the execution of at least one batch application in the netcentric computing system. The restart/recovery services automatically recover and restart a batch application if an error event is experienced while the netcentric computing system is processing the batch application. The batch balancing services keep track of run-to-run balances and totals of a plurality of predetermined data values for at least one batch application. The batch report services preferentially include at least one report application that automatically generates a predetermined report, which summarizes the execution of a respective batch application on the netcentric computing system. In the preferred embodiment, the report may take several forms, including an e-mail file, a printed document, a fax, an electronic archive file and an HTML document.

Another aspect of the present invention discloses a method of providing a base services architecture in a netcentric computing system. In this embodiment, at least one web server is provided that is connected with an Internet connection and at least one client, wherein the client includes a web browser. A plurality of documents are transferred and published to the web browser on the client with a web server service that is located on the web server. Members on a subscriber list are automatically notified of a change in a piece of information in a subject area of interest with a push/pull services that is located on the web server.

In the preferred method, workflow is managed in the netcentric computing system with a workflow service that is located on the web server that includes role management service, route management services, rule management services and queue management services. Batch application are processed on the netcentric computing system with a batch processing service on the web server, wherein the batch processing service includes batch driver services, restart/recovery services, batch balancing services and batch report services. In addition, reports are generated on the netcentric computing system with a report service that is located on the web server.

Yet another aspect of the present invention discloses a batch application framework for a netcentric computing system. In this embodiment, the batch application framework includes at least one batch application. A driver program controls the batch application. A system log holds error, warning, and status messages that are generated by the batch application during execution of the batch application. At least one flat file is used for storing a plurality of data files that are used by the batch application. At least one data storage table comprising relational databases is used for storing data that is processed by the batch application.

A program run log is used to record statistics related to a single execution of the batch application. In addition, a program status file is used for containing a flag for that indicates whether the batch application has made a successful run. A batch control table is used to control restart processing and run-time parameters for the batch application. A posting control table that contains totals of numeric fields used in the data storage table is also provided. Finally, a run control table for monitoring the status and size of the flat files is also used in the preferred batch application architecture.

Further objects and advantages of the present invention will be apparent from the following description, reference being made to the accompanying drawings wherein preferred embodiments of the present invention are clearly shown.

DETAILED DESCRIPTION OF THE PRESENTLY PREFERRED EMBODIMENTS OF THE INVENTION

Figure 1:
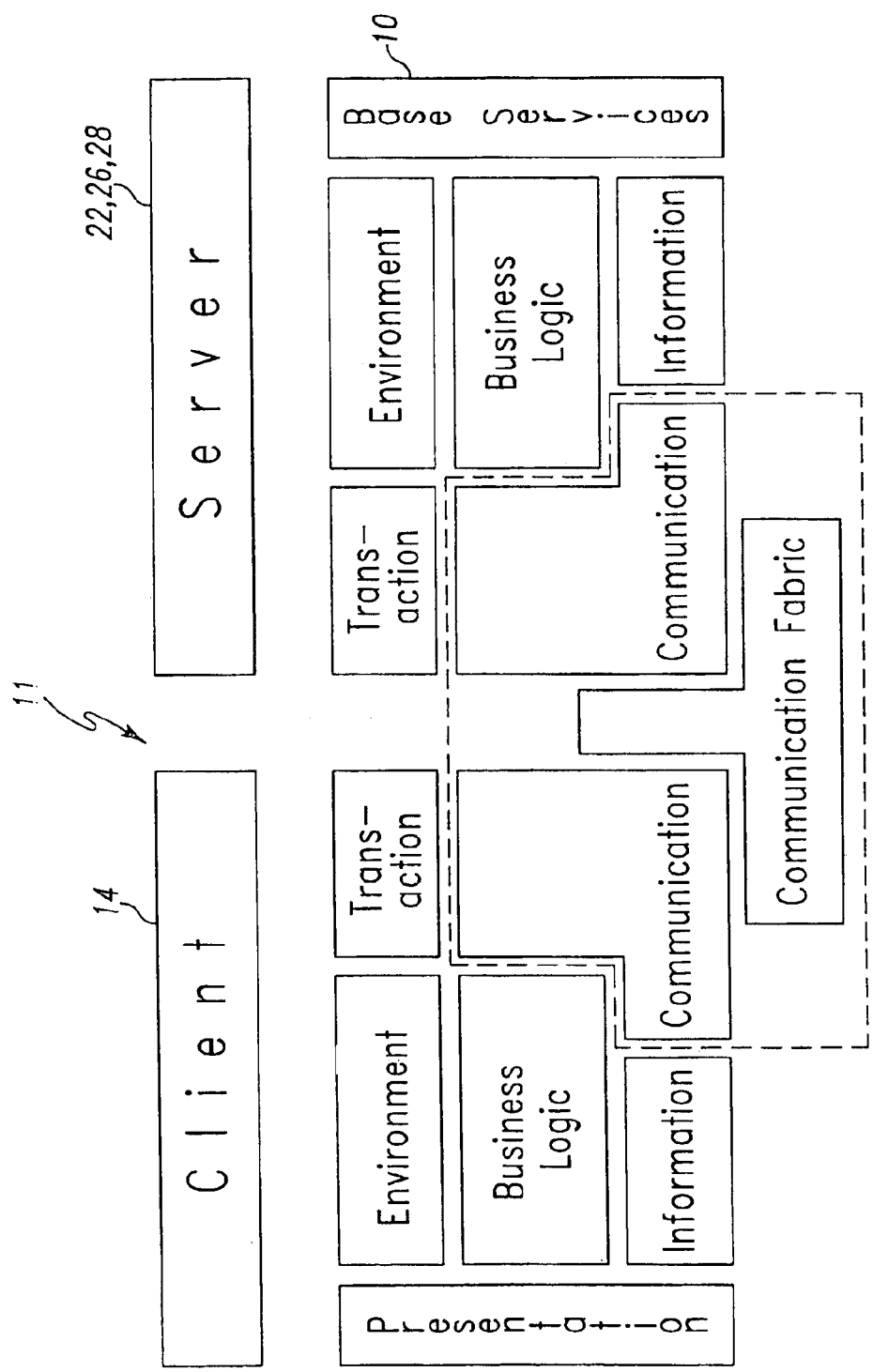
FIG. 1 illustrates a netcentric execution architecture for a netcentric computing system that includes a base-services architecture.
Figure 2:
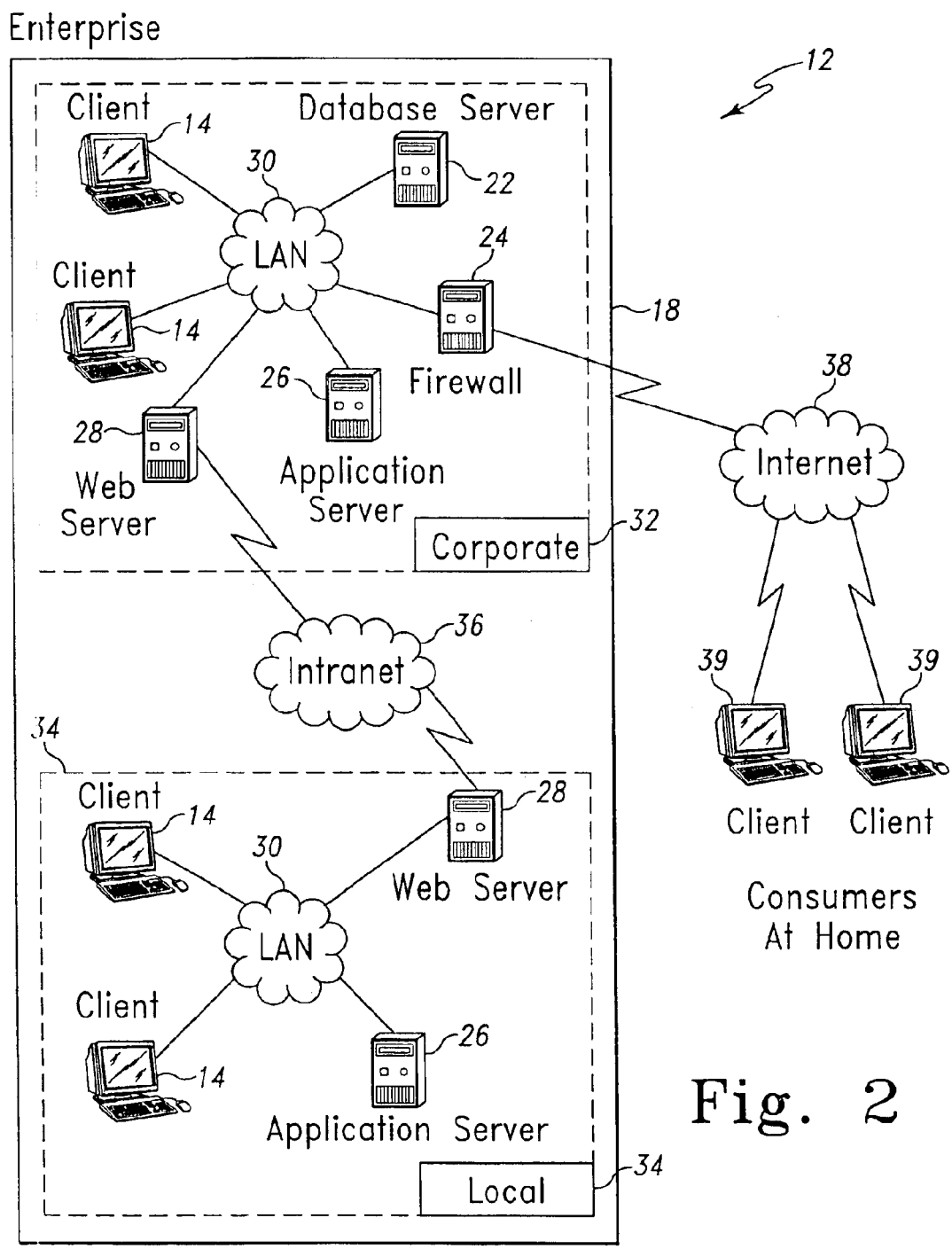
FIG. 2 illustrates a representative netcentric computing system.

Referring to FIGS. 1 and 2, the present invention discloses a base-services architecture 10 used in a netcentric execution architecture 11 of a netcentric computing system 12. The netcentric computing system 12 includes at least one client 14 that is connected with at least one server 22, 26, 28. As illustrated in FIG. 1, the base-services architecture 10 is located on the servers 22, 26, 28 and is used by the servers 22, 26, 28 during operation, as set forth in greater detail below. Referring to FIG. 2, the physical picture of an illustrative netcentric computing system 12 is illustrated. In this example, a business enterprise 18 includes at least one client 14, at least one database server 22, at least one firewall 24, at least one application server 26, at least one web server 28 and a local area network (LAN) connection 30, which are electrically connected as illustrated in FIG. 2.

As generally known in the art, LAN connections 30 are comprised of software applications and various computing devices (network cards, cables, hubs, routers, etc.) that are used to interconnect various computing devices (i.e.— clients 14 and servers 22, 26, 28) that are located at a first business enterprise location 32 to form a network at that location. The term LAN connection 30, as used herein, should be broadly construed to include any and all hardware and software applications that allows clients 14, servers 22, 26, 28 or other computing devices to be electrically connected together to share and transfer data. Although not illustrated, other devices such as printers may be connected with the LAN connection 30 so that the resource is available to users of the network. Those skilled in the art would recognize that various types of LAN connections 30 exist and may be used in the present invention.

For the purpose of the present invention, the firewall 24 is used to isolate internal systems from unwanted intruders. In particular, firewalls 24 isolate web servers 28 from all Internet traffic that is not relevant to the netcentric computing system 12. In the preferred embodiment, the only requests allowed through the firewall 24 are for services located on the web servers 28. All requests for other applications (e.g., FTP, Telnet) and other IP addresses that the netcentric computing system 12 receives are typically blocked by the firewall 24 during operation of the netcentric computing system 12.

The web servers 28 are the primary interface to the clients 14 for all interactions with the applications or services that are provided by the netcentric computing system 12. The main task of the web servers 28 is to authenticate the clients 14, establish a secure connection from the clients 14 to the web servers 28 using encrypted messages, and allow applications the clients 14 are using to transparently access the resources of the netcentric computing system 12. The web servers 28 are responsible for accepting incoming HTTP (Hypertext Transfer Protocol) messages and fulfilling the requests. For dynamic HTML (Hypertext Markup Language) page generation, requests are forwarded to the application servers 26. During operation, static pages, such as help pages, are preferably generated entirely by the web servers 28. The term client should be construed herein to include remote clients and local clients, unless otherwise specified, as set forth in detail below.

In the preferred embodiment, the primary function of the application servers 26 is to provide a link through which the web servers 28 can interact with the clients 14, trigger business transactions, and send back resulting data to the clients 14. A fundamental role of the application servers 26 is to manage the logical flow of transactions and keep track of the state of sessions. The application servers 26 are also responsible for managing all sessions within the netcentric computing system 12. A session is a period of time in which a client 14 is interacting with, and using, a resource of the netcentric computing system 12.

In the preferred embodiment of the present invention, the main purpose of the database servers 22 is to handle an application log. All requests sent to the web servers 28 and application servers 26, as well as their respective responses, are logged in the application log. The application log is preferentially used for traceability. In the preferred embodiment, requests are logged in the application log directly by the application server 26. Those skilled in the art would recognize that any number of data items can be monitored and kept track of in the application log.

As further illustrated in FIG. 2, a second business enterprise location 34 may be connected with the first business enterprise location 32 using an intranet connection 36. Those skilled in the art would recognize that various intranet connections 36 exist and may be used in the present invention. The intranet connection 36 allows the computing resources of the second business enterprise location 34 to be shared or connected with the computing resources available at the first business enterprise location 32. The term intranet connection 36, as used herein, should be broadly construed to include communication devices and software applications as well as various other connection devices used to physically interconnect two or more business networks. Although not illustrated, several other enterprise locations, each containing its own computing resources, may be connected with the netcentric computing system 12 using other intranet connections 36.

In the preferred embodiment illustrated in FIG. 2, the firewall 24 of the first business enterprise location 32 is connected with an Internet connection 38 to a plurality of remote clients 39. The remote clients 39 that are connected to the Internet connection 38 preferentially access data and communicate with the services of the netcentric computing system 12 through the Internet connection 38 using web browser applications that are located and running on the remote clients 39. The Internet connection 38 gives the remote clients 39 the ability to gain access to applications, information and data content that may be located on the database server 22, the application server 26 and the web server 28, preferably by means of the web server 28.

As used herein, the term Internet connection 38 should be broadly construed to include any software application and hardware device that is used to connect the remote clients 39 and the servers 22, 26, 28 with an Internet service provider (not illustrated) that establishes the connection to the Internet. Those skilled in the art would recognize that the clients 14, 39 and the servers 22, 26, 28 may establish the Internet connection 38 with the Internet service provider using modems, cable modems, ISDN connections and devices, DSL connections and devices, fiber optic connections and devices, and satellite connections and devices to name a few. For the purpose of the present invention, it is important to understand that the remote clients 39 and servers 22, 26, 28 are connected with one another through the Internet connection 38.

For a detailed discussion of the elements of the netcentric execution architecture 11 as well as netcentric computing systems 12, refer to U.S. patent application Ser. No. 09/676,227 entitled ARCHITECTURES FOR NETCENTRIC COMPUTING SYSTEMS, which was filed on Sep. 29, 2000, and is hereby incorporated by reference, in its entirety.

Figure 3:
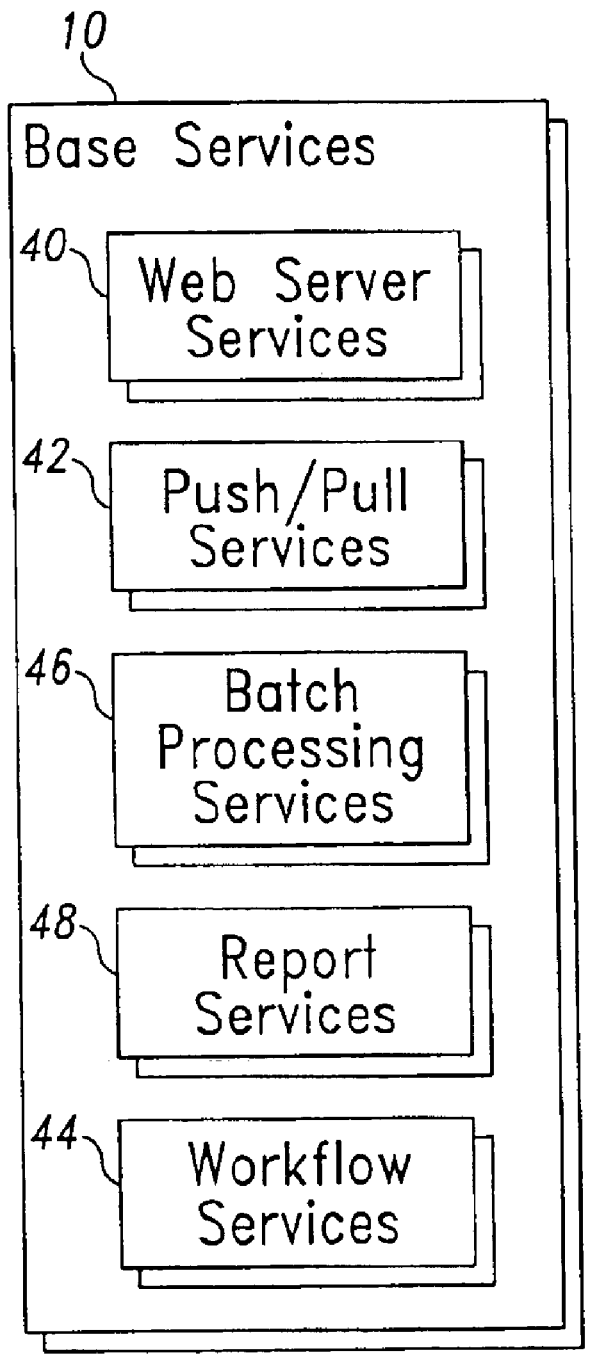
FIG. 3 depicts a base-services architecture for a netcentric computing system.

Referring to FIGS. 1–3, the present invention discloses a base services architecture 10 that is used in a netcentric computing system 12. Preferentially, the base services architecture 10 is part of a netcentric execution architecture 11; however, the base services architecture 10 may be incorporated in other computing systems as well, using all or some of the other components of the netcentric execution architecture 11. As illustrated in FIG. 3, the preferred base services architecture 10 includes web server services 40, push/pull services 42, workflow services 44, batch processing services 46 and report services 48. The base services 10 provide support for delivering applications to a wide variety of users over the Internet, intranet, and extranet.

The web server services 40 enable organizations to manage information, publish information and deploy applications over the Internet connection 38 to the remote clients 39 that are connected with the netcentric computing system 12. Internal clients 14, ones that access the netcentric computing system 12 through LAN connections 30 and intranet connections 36, may also be provided with use of the web server services 40. The web server services 40 are capable of managing documents in most formats such as HTML, Microsoft Word, Novell WordPerfect, etc. In addition, the web server services 40 handle requests from the client 14 for HTML pages through a web browser on the clients 14, 39. The web browser initiates an HTTP request to the web server 28 either specifying the HTML document to send back to the web browser or the server application (e.g., CGI, ASP) to execute. If a server application is specified, the web server 28 executes the application, which generally generates a formatted HTML page. The web server 28 then passes or communicates this formatted HTML page to the web browser on the clients 14, 39 just as it would any standard HTML document.

The preferred web server services 40 are also capable of processing scripts, such as Common Gateway Interface (CGI) and Active Server Pages (ASP). Server 22, 26, 28 side scripting enables programs or commands to be executed on the server 22, 26, 28, which provides access to resources stored both inside and outside of the network environment created by the web server 28. For example, server side scripts can be used to process requests for additional information, such as data from a remote database management system (RDBMS). As known in the art, scripts are a type of application that consists of a set of instructions to an application or utility program. A script usually consists of instructions expressed using the application's rules and syntax, combined with simple control structures such as loops and if/then expressions.

The web server services 40 also provide caching of web pages that are generated by the web servers 28 in response to requests by the clients 14, 39. The first time a user on a client 14, 39 requests a web page, the web server 28 retrieves that page from the netcentric computing system 12 and stores it temporarily in a cache memory on the web server 28. When another page or the same page is requested, the web server 28 first checks to see if the page is available in the cache. If the page is available in the cache, the web server 28 retrieves it from the cache; otherwise, it retrieves it from the netcentric computing system 12. The web server 28 can retrieve the page from the cache more quickly than retrieving the page again from its location out on the netcentric computing system 12. The web server 28 typically provides an option to verify whether the page has been updated since the time it was placed in the cache memory, and if it has to get the latest update.

Referring to FIG. 3, the push/pull services 42 allow for a user's interest in a particular piece of information or subject area to be registered such that any changes or new information concerning that particular piece of information or subject area can then be communicated to a subscriber list stored on the web server 28. Traditional Internet users "surf" the Internet or Web by actively moving from one web page to another using their web browser, manually searching for content they want and "pulling" it back to the clients 14, 39 via a graphical web browser through the assistance of an Internet connection 38.

The push/pull services 42, which may be provided using subscription servers (although not illustrated), allow content providers and business enterprises 18 to broadcast information directly to individual clients 14, 39 based on subscription lists that are related to particular areas of interest. The technology uses the Internet's strengths as a two-way conduit by allowing people to specify the type of content they want to receive. Content providers then seek to package the requested information for automatic distribution to the clients 14, 39 from the web server 28 as soon as new information is available.

Depending upon requirements, synchronous or asynchronous push/pull services 42 may be required. Synchronous push/pull services provide a mechanism for applications to be notified in real time if a subscribed item changes (e.g., a stock ticker) and might require a steady connection between the subscriber (i.e., clients 14, 39) and the information (i.e., web server 28). Asynchronous push/pull services do not require that a session-like connection be present between the subscriber (i.e.—clients 14, 39) and the information (i.e., web server 28). Internet ListServers are an example of asynchronous push/pull services. Subscribers of ListServers use e-mail to register an interest in a topic and are notified via e-mail when changes occur or relevant information is available. Asynchronous push/pull services can be useful for pro-actively updating customers on changes in order status or delivering information on new products or services in which they have expressed an interest.

The workflow services 44 of the base services architecture 10 control and coordinate the tasks that must be completed in order to process a business event on the netcentric computing system 12. For example, at one major financial institution, prior to an employee promotion, employees must complete an essay explaining reasons for the promotion. This essay and the personnel file must be routed to numerous individuals who must review and approve the material. As such, the preferred workflow services 44 would coordinate the collection and routing of this information among users who access this information via clients 14, 39.

In the preferred embodiment of the present invention, the workflow services 44 enable tasks within a business process or event to be passed among the appropriate participants, in the correct sequence, and facilitates their completion within set times and budgets. Task definition includes the actions required to be taken as well as work folders containing forms, documents, images and transactions that need to be included in completion of the business process or event. The workflow services 44 can follow business process rules, routing information, role definitions and queues. Workflow functionality is crucial for the customer service and engineering applications to automate the business value chains, and monitor and control the sequence of work electronically.

The business processes can be of a repetitive nature, automatically routing and controlling the review of a work plan through the approval stages. These are called "production workflows." Conversely, it can be an ad hoc process. For example, for a utility company, a workflow can generate and deliver to an available meter reader a work order for a special meter reading. In production workflows, the processes are predefined, whereas ad hoc workflows are created only for a specific, non-recurring situation. Often it is difficult to determine how much ad hoc functionality needs to be provided. An overly strict production workflow may not support necessary special cases that must be handled in an ad hoc fashion.

The work flow services 44 further provide the netcentric computing system 12 with a mechanism to define, monitor, and control the sequence of work electronically. As such, these services are typically provided by the servers 22, 26, 28 on the netcentric computing system 12 as they often coordinate activities among multiple users on multiple clients 14, 39 which may be connected with the netcentric computing system 12 from multiple geographic locations. The following are some of the architectural and integration issues that are solved by the preferred workflow services 44.

The preferred workflow services 44 are capable of providing seamless integration of multiple processes. As such, the workflow services 44 control the business process. For example, it should be able to open a word processor with the relevant data coming from a previous business process. The workflow services 44 also provide the netcentric computing system 12 with the ability to interface with host-based hardware, system software, and database management systems. This is essential because the workflow services 44 are located between the client-based and host-based processes; that is, the preferred workflow services 44 are capable of initiating client-based, as well as host-based applications.

The preferential workflow services 44 are also capable of being provided to clients 14 through LAN connections 30 and intranet connections 36 that are used in the netcentric computing system 12. Connectivity must include all business sites for the supported processes, enabling a large number and variety of users (i.e., clients 14, 39) to use the workflow services 44, and thus to execute business processes or events. As such, the workflow services 44 are capable of being provided to all clients 14, 39, regardless of the method that the clients 14 use to connect to the netcentric computing system 12. Unless otherwise specifically noted, those skilled in the art would recognize that the disclosed services herein may be provided to clients 14 or remote clients 39.

Another aspect of the preferred workflow services 44 is the capability of integrating and communicating with several different types of peripherals that might be connected with the netcentric computing system 12. As such, the preferred workflow services 44 support the use of many different types of printers, modems, fax machines, scanners, and pagers in conjunction with the netcentric computing system 12. The workflow services 44 is also capable of integrating with any office automation equipment, imaging, electronic mail, and legacy applications that might be used in the netcentric computing system 12.

In the preferred embodiment of the present invention, the workflow services 44 may be further divided into role management services, route management services, rule management services and queue management services. The role management services assign tasks to roles, which can then be mapped to individuals within the organization. A role defines responsibilities that are required when completing a business process or event. A business worker must be able to route documents and folders to a role, independent of the specific person, or process filling that role.

For example, a request is routed to a supervisor role or to Purchasing, rather than to "Mary" or "Tom." If objects are routed to Mary, and if Mary then leaves the company or is reassigned, a new recipient under a new condition would have to be added to an old event. Roles are also important when a number of different people have the authority to do the same work, such as claims adjusters. In this case, the request can simply be assigned to the next available person. The role management services provide this additional level of directory indirection to ensure proper message delivery.

The route management services route tasks to the next role, which can be done in the following ways: serial—tasks are sequentially performed; parallel—tasks are divided among different users; conditional—routing is based upon certain conditions; and ad hoc—tasks which are not part of a predefined process that need to be routed to particular users. The route management services route work to the appropriate workflow queues. When an application completes its processing of a task, the netcentric computing system 12 uses the route management services to route the work in progress to the next required task or tasks and, in some cases, notifies interested users (i.e., accessing the information from clients 14, 39) of the resulting work queue changes.

The automatic movement of information and control from one workflow step to another requires work profiles that describe the task relationships for completing various business processes or events. Users can be given access to these work profiles from clients 14, 39. Such access can be solely informational to allow the user to understand the relationship between tasks, or identify which tasks need to be completed for a particular workflow. Access can also be navigational to allow the user to move between tasks. The route management services support the routing and delivery of other necessary information (e.g., documents, data, forms, applications, etc.) to the next step in the workflow as needed. So, for example, as one task is completed, such as the entry of a purchase order, the next role in the process, which might be shipping, will be notified of the task and sent a copy of the purchase order together with a shipping invoice.

A business process workflow is typically comprised of many different roles and routes. Decisions must be made as to what to route to which role, and when. The rule management services provide applications that support the routing of workflow activities by providing the intelligence necessary to determine which routes are appropriate given the state of a given process and knowledge of the organization's workflow processing rules. The rule management services are typically implemented through easily maintainable tables or rule bases, which define the possible flows for a business event.

The queue management services use applications that provide access to the workflow queues that are used to schedule work. In order to perform workload analysis or to create "to-do lists" for users, an application may query these queues based on various criteria (a business process or event, status, assigned user, etc.). In addition, manipulation services may be provided to allow queue entries to be modified. As set forth above, the preferred workflow services 44 allow users and management to monitor and access workflow queue information and to invoke applications directly.

As illustrated in FIG. 3, the preferential base services 10 also include batch processing services 46 that include batch applications that are required on the netcentric computing system 12. The batch processing services 46 are typically associated with applications that handle a batch of many business transactions that have been accumulated over a period of time (an hour, day, week, month, year). The batch processing services 46 include batch applications that are used to perform large-scale repetitive processing where no user involvement is required, as well as reporting.

In one preferred embodiment, the batch processing services 46 include batch applications that handle general business processing tasks, such as payroll or billing, and can also include report generation. Batch applications should be used in preference to online modules in the netcentric computing system 12 when the same process, or set of processes, must be applied to many data entries in a repetitive and predictable fashion. In addition, batch-processing applications should be used when there is either no manual element to the process or task, or the manual element can be completely separated from a batch element. Batch-processing applications should also be used in the netcentric computing system 12 whenever the volume of information to be presented to a user is too great to be processed online over an Internet connection 38, or it can be better printed in batch run.

Some steps that are performed when tasks are completed in batch processing on the netcentric computing system 12, in the order typically used, are: 1) extraction: a program that reads a set of records from a database or input file, selects records based on predefined rules, and writes the records to an output file; 2) updating: a program that reads an input file, and makes changes to a database driven by the data found in each input record; and 3) formatting: a program that reads an input file, restructures data from this record according to a standard format, and produces an output file for printing or transmission to another program or system.

Between the steps set forth above may be one or more of the following steps, which include sorting, splitting and merging. In sorting, a program reads an input file and produces an output file where records have been re-sequenced according to a sort key field in the records. Sorts are usually performed by standard system utilities. Splitting is performed by a program that reads a single input file, and writes each record to one of several output files based on a field value. Merging is performed by a program that reads records from multiple input files and produces one output file with combined data from the input files. Those skilled in the art would recognize that other steps may need to be performed when performing batch processing on the netcentric computing system 12.

In another preferred embodiment of the present invention, the batch processing services 46 include driver services, restart/recovery services, batch balancing services and batch report services. The driver services provide the control structure and framework for batch applications. The driver services are also referred to as batch scheduling services. In the preferred embodiment, the driver services might be supported by commercially available schedulers. Some commercially available schedulers manage the flow of processing within and between modules and utilities (e.g., extracts, sorts, etc.), and manage interdependencies of applications and resources.

The preferred driver services are also capable of providing integration with check-pointing facilities and context management. More advanced driver services, used in the present invention, support parallel batch streaming and control the coordination between concurrent online and batch application execution. The preferred driver services are also capable of providing the batch processing services 46 with process dependencies and process prioritization.

The preferred restart/recovery services automatically recover and re-start batch applications if the applications should fail during execution. The restart/recovery services support the restoration of context information and the repositioning of batch applications and data sets to the point prior to the failure or error. This saves time in data recovery and program execution. Without the restart/recovery services, long-running batch applications may need to be completely re-run when and if they fail, which could jeopardize completion of the batch run within a defined batch window. The restart/recovery services use applications that are typically supported by commercially available schedulers to perform these tasks.

The batch balancing services support the tracking of run-to-run balances and totals for the batch applications of the batch processing services 46. The batch balancing services reduce the effort associated with manually checking system control reports. As such, when a batch application is done running, a person monitoring the running of the batch application can check the balances and totals for a particular run to determine if any errors occurred.

The batch report services use project reporting applications that summarize and communicate information using either printed paper or an online report viewable from a client 14, 39 using a web browser application. The batch report services preferentially generate reports using standard techniques (e.g., GANTT, PERT, and CPM) and ad-hoc reporting. The batch report services are capable of handling configurable distribution, printing, and/or archiving. As such, the batch report services support the distribution of reports that are generated by the netcentric computing system 12.

In addition, the batch report services of the batch processing services 46 assist in the splitting of reports into defined sections and the electronic routing of these report sections to specific targets, including user screens, e-mail, printers, faxes, electronic archives, and various other types of computing devices. The batch report services also support standard report layout features, such as breakpoints, summarizations, and font/color control.

Figure 4:
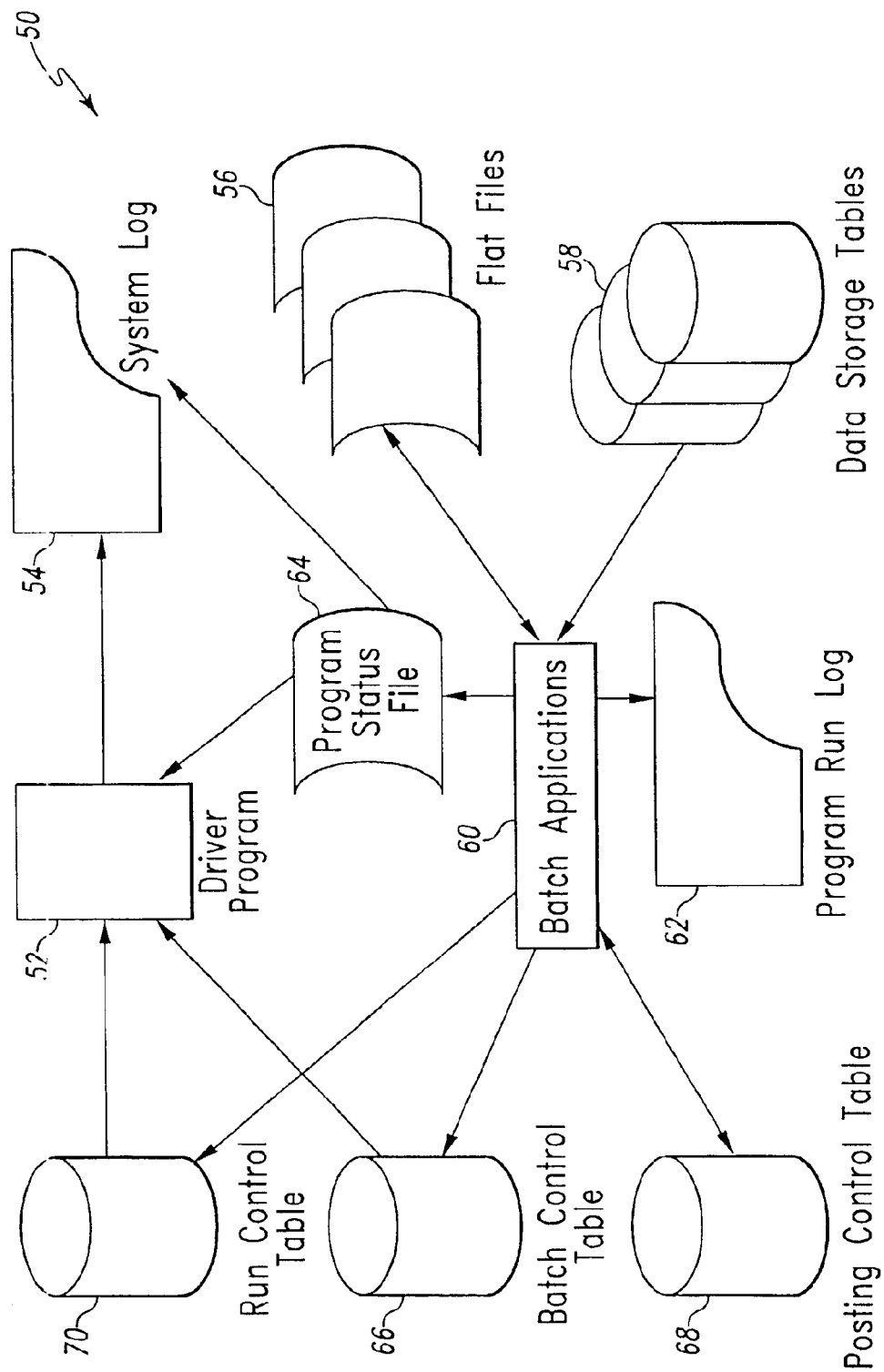
FIG. 4 depicts a batch application architecture for the base services.

Referring to FIG. 4, the present invention also discloses a batch application architecture 50 that can be used in the batch processing services 46 of the base services 10 as a foundation for the optimal creation of batch applications for the preferred netcentric computing system 12. The preferred batch application architecture 50 includes a driver program 52, a system log 54, at least one flat file 56, at least one data storage table 58, at least one batch application 60, a program run log 62, a program status file 64, a batch control table 66, a posting control table 68 and a run control table 70. Each of the above-referenced elements are discussed in detail below.

The driver program 52 is the controlling entity in the batch application architecture 50. This program can control one or more batch applications, or control other driver applications within the driver program 52. Multiple scripts are usually called in succession to form a job flow in a batch application (analogous to CL on the AS/400, JCL on mainframes, DCL on VAX, and so forth). The driver program 52 is usually executed asynchronously, and thus an interactive session during execution of the batch application is not required.

Sub-programs invoked within the driver program 52 can be executed in the background, as well. This technique allows a single shell script to control multiple sub-programs at once. The driver program 52 will remain resident until all previously invoked subordinate programs have completed. Then, the program status files 64 (defined below) are interrogated to ensure successful execution of subordinate programs. After this, appropriate completion messages are then written to the system log 54 (also defined below) and the batch processing is concluded.

The system log 54 is used to hold all error, warning, and status messages associated with the execution of batch processing on the netcentric computing system 12. The system log 54 represents a detailed history of all batch activity. The flat files 56 are data files, usually containing ASCII or binary data, in the form of fixed or variable length records. In ASCII form, they can serve as a means for information exchange between the operating environment, batch applications, and other operating components. Flat files 56 are files that may be used as input and/or output to 3GL, 4GL, or UNIX driver programs.

The data storage tables 58 are relational database tables preferentially defined using one of several predefined database management system environments (Informix, Sybase, Oracle, DB2, and so forth). The data storage tables 58 are used to store data that is used by the batch application 60. The data storage tables 58 can interact with 3GL programs using the DBMS embedded SQL language, or with 4GL languages that are designed to support the DBMS. Data storage tables typically contain that information (data) that is processed by the batch applications.

Batch applications 60 are coded programs that operate in a batch mode. Batch modes perform large amounts of repetitive tasks. The most common programming languages used to create these applications are C and COBOL. Specially designed fourth-generation languages (4GLs), such as Accell, may also be used. When 4GLs are used for batch applications 60, development times tend to decrease and execution times tend to increase.

Special batch applications 60 must also be used to ensure data integrity, manage restart processing, and provide execution statistics. Like the driver programs 52 which are coded to run in batch mode, the batch applications 60 include programs that are designed to run in the background with no interactive processing or user screens required. After the program is executed with the proper input arguments, it will process continuously until successful completion, or until a problem is encountered. Status information and run totals are reported in the form of a file, called program run logs 62 (defined below).

Batch application run times may vary from several minutes to several hours, depending on I/O requirements and complexity of the batch application 60. In general, file system I/O takes significantly less time than I/O due to database management system overhead.

The program run log 62 is a file that contains various statistics related to a single execution of a batch application

60. Statistics may include start and stop times and/or dates, number of records input/output, "hash" totals used to verify data integrity, or error information in case of abnormal program termination.

The program status file 64 is usually a single byte file containing a 0 or 1, which is used to indicate the successful completion of a batch application 60. This file may be interrogated by the driver program 52 that executes more than one sub-program to control restart processing and to ensure successful completion of batch applications 60. Only batch applications 60 that have completed unsuccessfully for the most recent execution (as indicated by the existence of a 0 or 1 in this file) will be re-invoked by the driver program 52.

The batch control table 66 is a file that contains a table that is used to control restart processing and run-time parameters for batch applications 60. The most significant reason for the existence of the batch control table 66 is to allow for efficient restart processing when a batch application 60 normally takes several hours to complete execution. The batch control table 66 is a file that is created preferentially containing a minimum of two fields: a character field and a numeric field. The character field preferentially contains the names of the batch applications 60 designed to use this table. The numeric field preferentially indicates the number of records processed by a particular batch application 60 at various points during its execution.

In one preferred embodiment, as batch applications 60 execute records corresponding to this particular batch applications 60 in the batch control table 66 are periodically updated to indicate the number of records processed. If the batch application 60 encounters an unexpected error during execution, or a hardware failure occurs, the numeric field in the batch control table 66 will still contain the count of records successfully processed before the failure occurred. When the error is corrected, or the hardware recovers, the batch application 60 is re-executed (usually by re-executing the driver program 52). The batch application 60's first activity upon restart is to interrogate the batch control table 66 by reading its record count contained in the numeric field. If this value is non-zero, the batch application 60 will start processing from the data element or record following the last element or record successfully processed before the error or failure occurred. After successful completion, the record count in the batch control table 66 may be reset to a 0 or 1 so that the next task will begin with the first input data element.

In addition to the record count, in the preferred embodiment, the batch control table 66 also stores a relatively unique value associated with each input data element. This allows a data integrity check if restart processing is required, and helps ensure that no input data elements have been altered or lost in the netcentric computing system 12.

It is important to note that most database management system environments allow "transaction logging." This means that during execution, database data inserted or altered by batch applications 60 can be made permanently to the database, or buffered and committed, after several input data elements are processed. Otherwise, disk I/O would be required after each input data element is processed. Transaction logging allows a batch application 60 to restart processing, after an abnormal termination, at the last successful commit.

The batch control table 66 updates are only required when data is committed to the database, because the last commit will be undone, or "rolled back," in the case of program or hardware failure. Input data processed since the last commit will be reprocessed if restart is required. If transaction logging is not available, the batch control table 66 requires an update after each input data element is successfully processed. Because a batch application 60 must always interrogate the batch control table 66 during execution to determine which data element to begin processing, "tunable" parameters can also reside in the batch control table 66. These parameters can change characteristics about a batch application 60 each time the batch application 60 is executed in the netcentric computing system 12.

Some illustrative parameters that can be monitored and stored in the batch control table 66 might include: the number of input data elements to process before committing database inserts, changes, or deletes. In addition, a value may be used to indicate when to write a status message to the program run log 62. The message usually includes the number of records processed, as well as a time stamp. This can be a useful technique to track performance and progress of a batch application 60 that require several hours to complete.

The posting control table 68 is preferentially used to contain totals of numeric fields on large database tables. As batch applications 60 alter database data, the corresponding totals on the posting control table 68 are also adjusted to reflect adds, changes, and deletes to those numeric fields. During operation, the posting control table 68 can be used as a reference to ensure that: totals across tables are always equal, or "foot" and that a given database table contains the correct total(s) across all records, and no data has been lost.

The run control table 70 is used to indicate the status and file size of the flat files 56 used by the batch applications 70. Because most operating systems only support basic update locking, the run control table 70 is used to ensure that a batch application 60 does not attempt to alter a flat file 56 that is being read or altered by another batch application 60. In addition, the file size of database files is used to ensure that files passed between batch applications 60 retain their data integrity. For example, consider a flat file 56 that is output by one batch application 60, and then serves as an input to another batch application 60 at some later time. In order to ensure that the data integrity of the file is preserved, the batch application 60 to read the file as an input should check to ensure that the batch application 60 creating the file is finished writing output, and that the file size has not been altered since file creation once the file is received.

In order to accomplish this, the run control table 70 is first updated by the program creating the file, to indicate when output is being written, then to indicate the resultant file size produced. The batch application 60 to read the file then interrogates the run control table 70 upon start-up. If the "in-use" flag indicates that output is still being written to the file, the batch application 60 will shut down and indicate a "retry later" error message in the program run log 62 for that particular batch application 60. If the "in-use" flag indicates that output has been completed, the batch application 60 to read the file will then check the file size to ensure data integrity has been preserved since the flat file 56 was created before using the file.

During operation, the batch application 60 first performs an operating system call to determine the current physical size of the file. If this size does not match the file size in the run control table 70, as indicated by the batch application 60 that created the file, a "file size" error is written to the program run log 62 and the batch application 60 shuts down. Otherwise, processing continues normally.

In the preferred batch architecture 50, in order to minimize I/O requirements, as many operations as possible are performed in internal memory. This ability is most flexible when batch applications are coded in "C." In addition, when data aggregation, or summarization, is required for reporting purposes in the netcentric computing system 12, increment stored totals are used as often as possible when data is being initially processed, or "posted," to the database. This minimizes the need to reprocess the data at a later time to obtain aggregate totals. Further, common routines, or linked functions, are designed to perform common processing across all batch applications 60. This might include database I/O, error processing, or restart/recovery routines.

Preferentially, when batch applications 60 are being executed in the netcentric computing system 12, it is important to try to free as much memory as the environment will allow for during execution of the batch application 60. Performing memory allocation applications at batch application 60 start-up and not releasing memory until batch application 60 completion minimizes the need to perform time-consuming reallocation of internal memory many times throughout the execution of the batch application 60.

In the preferred netcentric computing system 12, design and construction of application, report and interface batch applications 60 starts with work unit partitioning. The business events defined during the system design phase will be split into client 14, server 22, 26, 28 and batch applications 60. Definition of the work units will include defining the operations to be contained within a work unit. A separate batch work unit will be defined for each batch particular batch application 60.

Batch procedure diagrams can be used to describe the design from which the code for a batch application 60 is built in the preferred netcentric computing system 12. These structure charts will be built using the functional specifications that are defined in the system design phase as input data. Additionally, batch application models can be created for the batch process types defined. These design models will be used by the designer as the starting point in design; programming shells defined for each batch process will be used by the programmer as the starting point for programming.

The following is an overview of the batch application 60 design used in the preferred batch architecture 50. A database driven program model is used for database update and database extract programs that are "driven" by rows or values retrieved from the database. This model opens a database cursor as input, then updates the database, creates error files, or creates temporary files depending on the requirements of the program. Different subprograms are used depending on whether the database driven programs require checkpointing, and depending on whether they require the ability to custom define when their checkpointing procedures are called.

A file-driven program model is used for batch applications 60 in the netcentric computing system 12 that are "driven" by records or values retrieved from a file. This model reads a file as input, verifies the input, then updates the database, and then creates temporary files or error files depending on the requirements of the batch application 60. Subprograms are used depending on whether file-driven programs require checkpointing.

A format report program model is used for batch applications 60 in the netcentric computing system that must format data output for standard reports. This model will take an input file (originally created by an extract program) and format the data as required for the output product. The report will be written to an output file. The Format Report Program will create headers and footers, format the data rows, and define report control totals.

A called module model may be used for procedures that are called from a batch applications 60. In this model, different subprograms of the batch applications 60 are used for called modules that select a single row from the database, that select a list of rows from the database, and that update the database.

The present invention also discloses a method of designing optimal batch applications 60 used in the batch application architecture 50 for the netcentric computing system 12. Although, the optimal method of designing batch applications 60 for the netcentric computing system 12 is set forth below, this is presented as the preferred method only. Those skilled in the art would recognize that batch applications 60 that are appropriate for a particular organization will vary from organization to organization and that other methods of setting up and designing batch applications 60 exist and may be used in the present invention.

In another preferred embodiment of the present invention, all batch applications 60 are written in COBOL. Batch application 60 design models and programming shells are used to simplify and standardize development, as well as to enhance programmer productivity. These shells also improve the maintainability of the batch applications 60. All I/O routines appear in separate paragraphs within the batch applications 60 programming code. These paragraphs are located at the end of the program (that is, in A6xxx, A7xxx and A8xxx paragraphs) or in separately called modules. The I/O routines are isolated from the main code of the program to prevent changes in the underlying data format and storage mechanism from rippling through the batch applications 60. Further, I/O routines are commonly reused in multiple places through the main program code, e.g., priming reads and "end of" loops. Placing code that is frequently used in the same area of the program helps reduce paging.

Further, all batch applications 60 that interact with the database, are SQL standard compliant. Changes in the SQL DBMS with which the program interacts cause only implementation or tuning changes to the batch applications 60. As such, the batch applications 60 do not require a complete rewrite. Each batch applications 60 also preferentially includes a SQL communications area (SQLCA). When an SQL statement is processed, a return code is placed in the SQLSTATE field of the program's SQLCA. This SQLSTATE is examined after each executable SQL statement to determine whether the SQL call was successful.

In the preferred embodiment, DECLARE CURSOR statements are also placed in the PROCEDURE DIVISION in the same paragraph as the associated OPEN CURSOR statements. Only one OPEN or CLOSE statement is defined per cursor in this embodiment. In addition, each batch applications 60 should be reviewed by the relevant database expert to ensure that physical I/O's to the database are minimized as much as possible. In particular, the following four common flaws are watched for: 1) reading data for every transaction when the data could be read once and kept in working storage; 2) rereading data for a transaction where the data was read earlier in the same transaction; 3) causing unnecessary table or index scans; and 4) not specifying key values in the WHERE clause of an SQL statement. As previously set forth, although the preferred method of designing batch applications 60 is set forth above, those skilled in the art would recognize that other programming methods exist.

Referring back to FIG. 3, the report services 48 are facilities for simplifying the construction and delivery of reports or generated correspondence in the netcentric computing system. The report services 48 help to define reports and to electronically route reports to allow for online review, printing, and/or archiving. The report services 48 also support the merging of application data with pre-defined templates to create letters or other printed correspondence.

Figure 5:
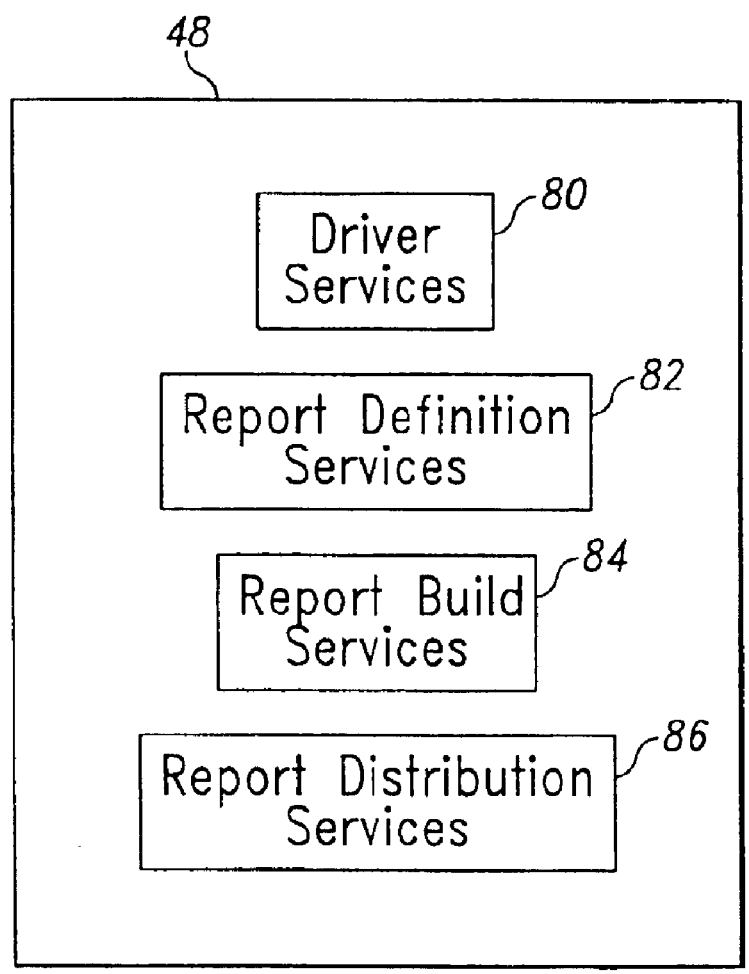
FIG. 5 depicts the preferred report services of the base services.

Referring to FIG. 5, the preferred report services 48 include report driver services 80, report definition services 82, report build services 84 and report distribution services 86. In the preferred embodiment, the report driver services 80 provide the control structure and framework for the reporting services 48. The report definition services 82 receive and identify the report request, perform required validation routines, and format the outputted report(s). After the request is validated, the report build function is initiated. The report build services 84 are responsible for collecting, processing, formatting, and writing report information (for example, data, graphics, text). The report distribution services 86 are responsible for printing, or otherwise distributing, the reports to users on particular clients 14, 39 that are requesting a report.

Figure 6:
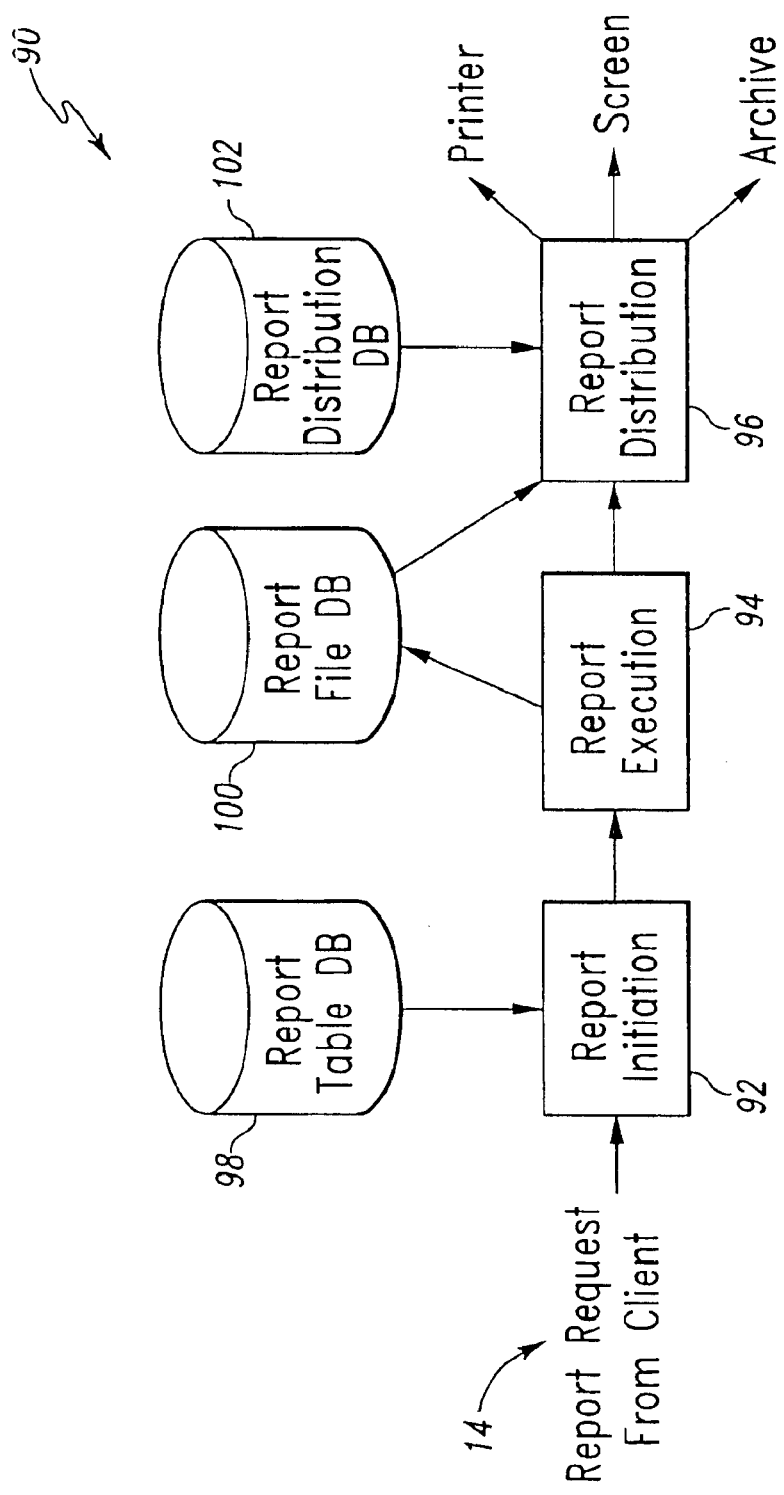
FIG. 6 illustrates a preferred reporting application framework.

During operation of the netcentric computing system 12, applications may request the report services 48 by sending a message to a reporting application framework 90, which is illustrated in FIG. 6. The reporting application framework 90 is used to preferentially design and implement applications within the report services 48. The following types of reports are supported by the reporting application framework 90: scheduled, on-demand and event driven. Scheduled reports are generated based upon a time and/or date requirement. These reports typically contain statistical information and are generated periodically (invoices and bills, for example). On-demand reports will be requested by users with specific parameters. The scheduling of these reports, the formatting, and/or the data requirements are not known before the request is made, so these factors must be handled at request time. Event-driven reports include reports whose generation is triggered based on a business or system event. An example here would be a printed trade slip.

As illustrated in FIG. 6, the preferred reporting application framework 90 includes report initiation functions 92, report execution functions 94 and report distribution functions 96. The report initiation function 92 is the interface for reporting applications into the reporting application framework 90. During operation, the client 14, 39 initiates a report request to the report application framework 90 by sending a message to the report initiation function 92. The responsibility of report initiation is to receive, identify, and validate the request and then trigger the report build process.

The main function of the report initiation functions 92 are receiving, identifying, validating a report request and initiating the report execution function 94. The identification function determines general information about the request, such as report type, requester, quantity to be printed, and requested time. Based on the report type, a table of reports 98 is examined in order to gather additional report-specific information and perform required validation routines for the report request. After the report identification and validation functions have been successfully completed, the reporting process can continue. If any errors are identified, the report initiation function 92 will return an error message to the requester application. If no error is present, the report initiation function 92 will initiate the report execution function 94.

The report execution functions 94 are the core of the reporting application framework 90. The main duties of the report execution functions 94 include formatting the report, collecting information, formatting the information and outputting the report. Formatting the report includes functions that are responsible for formatting the layout of the outputted report, including standard headers, column headings, row headings, and other static report information. The report execution function 94 is also responsible for collecting the information (for example, data, text, image, graphics) that is required for creating the report. After the information is collected, the report execution function 94 is responsible for formatting the collected information into the appropriate display format based upon the report type and the report distribution requirements. The report may then transfer the report to a file in a report file database 100. Once the report is formatted properly, the report execution function 94 initiates the report distribution function 96 in order to distribute the created report to the specified devices (printers, disks, and so forth) and individuals.

The process of collecting, processing, formatting, and outputting report data can be accomplished in several different ways. For example, one method is to create a program in C for each report format. Here, many aspects of report printing—such as page size, headings, footings, and printer control values—would have to be programmed in function calls to facilitate the report programming process. Information access to files or the database would be through information access services.

Another option is to use a third-party report tool, such as the SQR (Structured Query Report Writer) from SQL Solutions. SQR is a robust report generator designed to be used with SQL-based relational databases. SQR insulates the developer from programming in a third generation language by providing a higher-level programming language. SQL queries (information access) are placed directly into the SQR program.

The final requirement of the reporting application framework 90 is the report distribution function 96. Once the report has been generated, it must be distributed to the specified targets (devices and/or users). The report distribution function 96 will locate completed report files from the report file database 100 and route them to the appropriate devices within the netcentric computing system 12.

Typically, a report distribution database 102 is used to specify the destinations for each report supported by the report architecture. The report distribution database specifies where, when, how, and to whom to distribute the produced report. Specific destinations can include: printer(s), user(s), user groups, archives (permanent storage), and/or specific display devices such as workstations and terminals. Several additional options exist for distributing reports including timed reporting, multiple copy distribution, and report archiving. Also, a user interface function can be built to open and browse report files.

Several other preferred criteria should be considered and included in the preferred reporting application framework 90. The reporting application framework 90 can work with, and support maintenance of, a report repository on the platforms within the netcentric computing system 12. The report repository contains detailed definitions of the reports. The reporting application framework 90 can also work with and support distribution of reports generated on workgroup servers. The reporting application framework 90 can also support distribution of reports requested by users on demand. Typically, these reports will not have a set schedule or frequency for distribution. The report architecture must support distribution of these reports without the requirement of manual or user intervention (subsequent to initial set up and conversion).

The reporting application framework 90 can support distribution of regularly scheduled reports. Typically, these reports will have a set schedule and frequency for distribution. The report distribution package can support distribution of these reports without the requirement of manual or user intervention (subsequent to set up and conversion). The reporting application framework 90 should allow preview of reports online from a client 14, 39 prior to actual distribution. Ideally, the reporting application framework 90 would provide support for online preview of reports through software located on the client 14, 39.

The reporting application framework 90 should provide users with a graphical user interface and be capable of providing bilingual support if necessary. Further, the reporting application framework 90 should support basic preview functions. These include: scrolling up and down; scrolling left and right; and advancing to end or beginning of report without scrolling through intermediate pages.

In addition to the basic preview functions listed previously, certain advanced preview functions may also be used. These include: page indexing (allows users to jump to specific report pages); section indexing (allows users to jump to specific report sections); and search capabilities (allows users to search report for occurrence of a specific data stream).

Reports may occasionally contain sensitive information. It is therefore important that access to certain reports be restricted to authorized users. The reporting application framework 90 should provide a mechanism for implementing report level security. This security must be in place on all platforms within the netcentric computing system 12. At the workgroup level, the security may consist of downloading sensitive report files to a secure directory, and having the LAN administrator release the report as appropriate. Defining security at the report section, page, or field level would provide greater flexibility in determining and implementing report security. This is a desirable, though not mandatory, requirement of the reporting application framework 90.

The reporting application framework 90 should support the processing of reports in the background while the application works in the foreground during online hours. In other words, processing of reports should not negatively affect online response times, or tie up the client 14. The reporting application framework 90 may also provide a "humanly intelligible" address for all distributed reports. The address may be used by a print site operator, LAN administrator, or other personnel to manually sort printed output (if required). This criterion can be satisfied by automatic creation of banner pages or other means.

To provide sufficient information to users to avoid accidentally downloading or printing very large reports during peak usage hours, a distribution costing function can be used. This function would warn users of reports that would overload the network or a printer. This costing function might provide recipients with a rough estimate of the amount of time that distribution might take. Finally, during the online day, the delivery costing mechanism can disallow transmission of reports that exceed a predetermined cost.

The reporting application framework 90 may also support distribution of a single report to single or multiple destinations. For some systems, it is possible that multiple copies of a report will be sent to the same site, to several different users, for example. In these cases, it is highly desirable to have the reporting application framework 90 recognize these situations whenever possible and distribute the specified report only once.

The reporting application framework 90 may provide automatic print capabilities. Once a report has been distributed for printing (either through a "push" distribution scheduling mechanism or through a "pull" user request) no further user or operations personnel involvement should be necessary to print the report at the specified location. The reporting application framework 90 also supports distribution of reports for printing at centralized, remote, or local print sites without user or operations personnel intervention.

Printing on multiple types of printers, including line, impact, and laser printers, is also supported by the reporting application framework 90. This should not require user intervention, that is, the user should not have to specify the type of target printer. Ideally, the reporting application framework 90 would default this information from the user's profile or the default printer defined in the local operating system of the client 14. This criterion requires that the reporting application framework 90 support several print mechanisms, such as postscript drivers and host/mainframe protocols (for example, Advanced Function Printing— AFPI).

The reporting application framework 90 preferentially defaults the destination printer for a specific report (from the user's profile or operating system parameters). Additionally, the reporting application framework 90 should allow the user to change the printer specified. Validation of the print destination should also be included. The reporting application framework 90 should support distribution of "regular" reports and special forms reports.

Some reports may be printed on laser printers and/or may support electronic forms text (i.e., including the forms text in the report dataset as opposed to printing the report dataset on a pre-printed form). The reporting application framework 90 preferentially allows multiple fonts to be specified. The reporting application framework 90 also provides and/or facilitates archival or disposition of report datasets. Ideally, the reporting application framework 90 would permit definition of retention periods and disposition requirements.

The preferred reporting application framework 90 also is designed to allow distribution of the information contained in a report dataset to a user's intelligent workstation or client 14. The information should be in a form that can be imported to a local word processing software, decision support software package, or other appropriate application. In addition, the preferred reporting application framework 90 appears to users as if it were part of the overall application. This does not necessarily mean that the reporting application framework 90 must integrate seamlessly with the application; a message interface between the systems might be acceptable.

The preferred reporting application framework 90 may also provide users with the ability to print only selected pages or sections of the report. This reduces paper usage, while still allowing users to obtain a hard copy of the information as required. The preferred reporting application framework 90 may also allow a print job to be restarted from the point of failure rather than having to reprint the entire report. This is of particular concern for very large reports.

The following is a list of technical criteria that should be considered and included during the planning of implementing the preferred reporting application framework 90 used in the preferred netcentric computing system 12. The preferred reporting application framework 90 is compatible with the platform architectures used in the netcentric computing system 12. It is also compatible with local area networks and standalone workstation technology specified in the platform architectures used in the netcentric computing system 12.

Most systems will include support for WAN communication, so the reporting application framework 90 should be compatible with this environment. The reporting application framework 90 should be compliant with existing formal and de facto standards (for example, SQL Database Language, COBOL Programming Language, C Programming Language). The preferred reporting application framework 90 will also make use of an external user directory of preferences and locations. To reduce the storage requirements for the report repository, it is also desirable for the reporting application framework 90 to support data compression in the repository. Code page compatibility is included when translating characters to ASCII.

While the invention has been described in its currently best known modes of operation and embodiments, other modes and embodiments of the invention will be apparent to those skilled in the art and are contemplated. For other features, advantages and combinations of the present invention refer to U.S. Provisional Application Ser. No. 60/156,962, entitled NETCENTRIC AND CLIENT/SERVER COMPUTING, which is herein incorporated by reference in its entirety.

What is claimed is:

1. A base services architecture for a netcentric computing system, comprising,
   at least one web server connected with an Internet connection and at least one client; and
   at least one web server service, at least one push/pull service, at least one workflow service, at least one batch processing service and at least one report service located on said web server;
   wherein said batch processing service includes an extraction application that reads a set of records from an input file and selects records based on a set of predefined rules and creates an output file, an updating program that reads said input file and makes changes to a database driven by data found in said input file and a formatting program that reads said input file and restructures data from said input file according to a standard format to create a second output file.

2. The base services architecture of claim 1, wherein said web server service enables said web server to transfer and publish a plurality of documents in a web browser on said client.

3. The base services architecture of claim 2, wherein said documents are transferred to said web browser in an HTML format.

4. The base services architecture of claim 1, wherein said web server service enables said web server to transfer and execute a plurality of software applications in a web browser on said client.

5. The base services architecture of claim 1, wherein said web server service is capable of processing scripts on said web server in response to requests by said client.

6. The base services architecture of claim 5, wherein said scripts may be selected from the group consisting of common gateway interface scripts and active server page scripts.

7. The base services architecture of claim 1, wherein said web server service caches a plurality of web pages that are generated by said web server in response to requests from said client.

8. The base services architecture of claim 1, wherein said push/pull service automatically notifies members of a subscriber list on said netcentric computing system when a particular piece of information has been changed or updated.

9. The base services architecture of claim 1, wherein said workflow service uses said web server to control a plurality of business tasks that must be completed to process a business event in said netcentric computing system.

10. The base services architecture of claim 1, wherein said workflow service includes role management services, route management services, rule management services and queue management services.

11. The base services architecture of claim 1, wherein said batch processing service includes batch driver services, restart/recovery services, batch balancing services and batch report services.

12. The base services architecture of claim 11, wherein said batch driver services control execution of at least one batch application in said netcentric computing system.

13. The base services architecture of claim 11, wherein said restart/recovery services automatically recover and restart a batch application if an error event is experienced while the netcentric computing system is processing said batch application.

14. The base services architecture of claim 11, wherein said batch balancing service tracks run-to-run balances and totals of a plurality of predetermined data values for at least one batch application.

15. The base services architecture of claim 11, wherein said batch report services include at least one report application that automatically generates a predetermined report which summarizes the execution of a respective batch application on said netcentric computing system, wherein said report may be selected from the group consisting of an e-mail file, a printed document, a fax, an electronic archive file and an HTML document.

16. The base services architecture of claim 1, wherein said report services include report driver services, report definition services, report build services and report distribution services.

17. A batch application framework for a netcentric computing system, comprising:
   at least one batch application;
   a driver program executed asynchronously for controlling said batch application;
   a system log for holding error, warning, and status messages that are generated by said batch application during execution of said batch application;
   at least one flat file for storing a plurality of data files that are used by said batch application;
   at least one data storage table that stores data that is used by said batch application;
   a program run log that records statistics related to a single execution of said batch application;
   a program status file containing a flag for indicating the successful run of said batch application;
   a batch control table that is used to control restart processing and run-time parameters for said batch application, wherein said batch control table includes a character field and a numeric field, wherein said character field contains names of batch applications designed to use said batch control table, wherein said numeric field indicates a number of records processed at various points by said batch application;
   a posting control table that contains totals of numeric fields used in said data storage table, wherein said posting control table is adjusted to reflect adds, changes, and deletes to said totals of numeric fields; and
   a run control table for monitoring the status and size of said flat files, wherein said run control table further ensures that another batch application does not attempt to alter a respective flat file being used by another batch application.

* * * * *

UNITED STATES PATENT AND TRADEMARK OFFICE
CERTIFICATE OF CORRECTION

PATENT NO. : 6,874,010 B1
DATED : March 29, 2005
INVENTOR(S) : Scott R. Sargent

It is certified that error appears in the above-identified patent and that said Letters Patent is hereby corrected as shown below:

Title page,
Item [56], References Cited, U.S. PATENT DOCUMENTS, please add the following:
-- 5,930,512  07/1999  Boden et al. ............395/710
   6,289,382 B1  09/2001  Bowman-Amuah......709/226 --
FOREIGN PATENT DOCUMENTS, please add the following:
-- EP  0841616 A2  05/1998  G06F/9/445
   WO  95/23373 A1  08/1995  G06F/9/28 --
OTHER PUBLICATIONS, please add the following:
-- Ryan, H.W., Sargent, S.R., Boudreau, T.M., Arvanitis, Y.S., Taylor, S.J., Mindrum, C.; "Practical Guide to Client/Server Computing," Second Edition, pp. 1-774; Copyright 1998, CRC Press LLC, Boca Raton, FL, United Sates.

Ryan, H.W.; Alber, M.W.; Taylor, S.J.; Chang R.A., Arvanitis, Y.S.; Davis, M.C.; Mullen, N.K., Dove, S.L.; Mehra, P.N.; Mindrum, C.; "Netcentric Computing, Computing, Communications and Knowledge," pp. 1-413, Copyright 1998, CRC Press LLC, Boca Raton, FL, United States.

Touch, J., Hughes, A.S., "LSAM proxy cache: a multicast distributed virtual cache," Computer Networks and ISDN Systems," North Holland Publishing, Amsterdam, NL (3W3 Workshop, University of Manchester, 15-17th June 1998), Vol. 30, No. 22-23, 25 Nov. 1998, pp. 22-23.

Clip, P., "Servlets: CGI The Java Way," BYTE, McGraw-Hill, Inc., St. Peterborough, US, Vol. 23, No. 5, 1 May 1998, pp. 55-56.

Gwertzman, J.S., Seltzer, M., "The Case for Geographical Push-Caching," Workshop on Hot Topics in Operating Systems, 4 May 1995, pp. 51-55.

UNITED STATES PATENT AND TRADEMARK OFFICE
CERTIFICATE OF CORRECTION

PATENT NO. : 6,874,010 B1
DATED : March 29, 2005
INVENTOR(S) : Scott R. Sargent

It is certified that error appears in the above-identified patent and that said Letters Patent is hereby corrected as shown below:

<u>Title page (cont'd),</u>
Chamberlain, D.D., "Using the new DB2: IBM's object-relational database system," Morgan Kaufmann Publishers, USA, 1996, ISBN 1-55860-373-5, pp. 571-567. --

Signed and Sealed this

Seventh Day of June, 2005

JON W. DUDAS
*Director of the United States Patent and Trademark Office*